United States Patent
Shimazu (10) Patent No.: US 10,136,000 B2
(45) Date of Patent: Nov. 20, 2018

(54) IMAGE-FORMING DEVICE WITH DOCUMENT READING UNIT

(71) Applicant: KYOCERA Document Solutions Inc., Osaka (JP)

(72) Inventor: Kozo Shimazu, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/499,409

(22) Filed: Apr. 27, 2017

(65) Prior Publication Data

US 2017/0318162 A1 Nov. 2, 2017

(30) Foreign Application Priority Data

Apr. 27, 2016 (JP) ................................. 2016-088811

(51) Int. Cl.
*H04N 1/00* (2006.01)

(52) U.S. Cl.
CPC ..... *H04N 1/00037* (2013.01); *H04N 1/00013* (2013.01); *H04N 1/00082* (2013.01); *H04N 2201/0091* (2013.01); *H04N 2201/0094* (2013.01)

(58) Field of Classification Search
USPC ........ 358/1.1–3.29, 504, 505, 509, 512, 483
See application file for complete search history.

(56) References Cited

U.S. PATENT DOCUMENTS

| | | | | |
|---|---|---|---|---|
| 5,568,239 | A * | 10/1996 | Furukawa | C08G 77/24 118/DIG. 1 |
| 7,903,269 | B2 * | 3/2011 | Nakagawa | G03G 15/5079 358/1.14 |
| 8,248,640 | B2 * | 8/2012 | Tanaka | G03G 15/5058 347/224 |
| 8,822,908 | B2 * | 9/2014 | Tanaka | G02B 26/10 250/234 |
| 9,661,174 | B2 * | 5/2017 | Terada | H04N 1/00992 |

(Continued)

FOREIGN PATENT DOCUMENTS

JP 2008-109652 A 5/2008

Primary Examiner — Marcellus Augustin
(74) Attorney, Agent, or Firm — Hawaii Patent Services; Nathaniel K. Fedde; Kenton N. Fedde (57) ABSTRACT

Provided is an image-forming device that can execute operations that do not use a document-reading unit even when abnormality in a light source is detected in the initial operation at startup. The image-forming device includes a document-reading unit, and together with being able to execute image-forming operations that use the document-reading unit, is able to execute image-forming operations that do not use the document-reading unit. The image-forming device includes a light-source-abnormality-detection unit that executes a light-source-abnormality-detection operation, and when an abnormality in the light source is detected by the light-source-abnormality-detection operation that is executed at startup, stores the startup signal level that is outputted in a light-source-abnormality-storage unit as light-source-abnormality information. The image-forming device performs normal startup in which all image-forming operations can be executed regardless of the detection results of the light-source-abnormality-detection operation.

5 Claims, 4 Drawing Sheets

(56) References Cited

U.S. PATENT DOCUMENTS

2003/0117740 A1\* 6/2003 Mizumoto ........... G11B 5/5534
                                                    360/75
2008/0094653 A1   4/2008 Miwa
2008/0231917 A1\* 9/2008 Tsukahara .......... H04N 1/00002
                                                    358/475

\* cited by examiner

IMAGE-FORMING DEVICE WITH DOCUMENT READING UNIT

INCORPORATION BY REFERENCE

This application is based on and claims the benefit of priority from Japanese Patent Application No. 2016-088811 filed on Apr. 27, 2016, the contents of which are hereby incorporated by reference.

BACKGROUND

The present disclosure relates to an image-forming device that has a document-reading unit.

An image-forming device such as a copier, multifunctional device and the like includes a document reading unit for reading image data of a document, and an engine unit for performing image formation based on the image data. In the document-reading unit, light from a light source is irradiated onto a document surface, and the reflected light is read by a photoelectric conversion element such as a CCD, so when the light source goes OFF, the document is read as a solid black document. Therefore technology is proposed in which operation is stopped by detecting an abnormality according to the signal level of the photoelectric conversion element when the light source of the document-reading unit goes OFF.

SUMMARY

The image-forming device of the present disclosure is an image-forming device that includes a document-reading unit that irradiates light from a light source onto a document and by a photoelectric-conversion unit converts reflected light from the document to image data, and together with being able to execute image-forming operations that use the document-reading unit, is able to execute image-forming operations that do not use the document-reading unit. The image-forming device includes a light-source-abnormality-detection unit. The light-source-abnormality-detection unit executes a light-source-abnormality-detection operation that compares a signal level that is outputted from the photoelectric-conversion unit with a preset abnormality-detection threshold value, and when an abnormality in the light source is detected by the light-source-abnormality-detection operation that is executed at startup, stores the startup signal level that is outputted from the photoelectric-conversion unit at startup in a light-source-abnormality-storage unit as light-source-abnormality information. The image-forming device performs normal startup to a state in which all image-forming operations can be executed regardless of the detection results of the light-source-abnormality-detection operation that is executed at startup.

DETAILED DESCRIPTION

Next, an embodiment of the present disclosure will be explained in detail with reference to the drawings.

Figure 1:
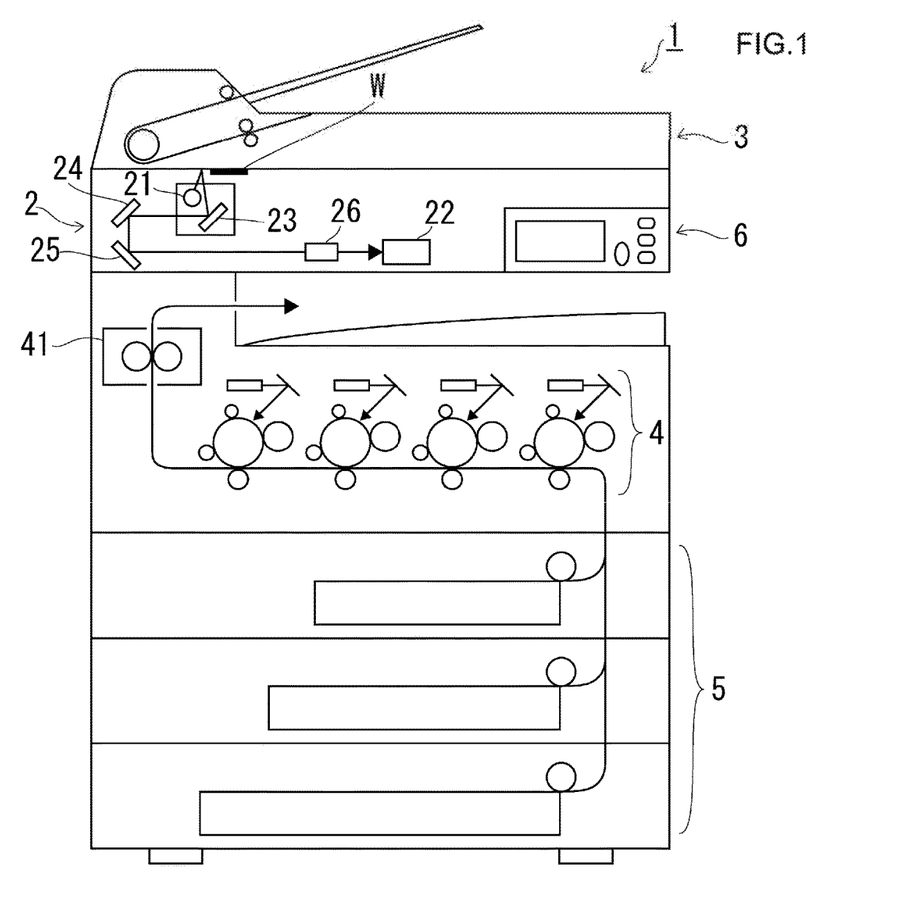
FIG. 1 is a schematic cross-sectional view providing an overview of the internal configuration of an embodiment of the image-forming device of the present disclosure.

The image-forming device 1 of this embodiment is a multifunctional device that uses an electrophotographic method, and referring to FIG. 1, includes a document-reading unit 2, a document-feeding unit 3, an image-forming unit 4, a printing-paper-supply unit 5 and an operation unit 6; and this image-forming device 1 executes various image-forming operations such as copying jobs, scanning jobs, transmitting jobs, printing jobs and the like.

The document-reading unit 2 includes a light source 21 and a photoelectric-conversion unit 22. The light source 21 irradiates light onto a document that is placed on the platen glass or that is fed from the document-feeding unit 3. The photoelectric-conversion unit 22 is a CCD or the like that converts the light reflected from the document into image data of the document. The reflected light from the document is guided to an imaging lens by way of mirrors 23, 24, 25, and the light that is collected by the imaging lens 26 enters into the photoelectric-conversion unit 22.

The image-forming unit 4 forms a toner image based on printing data, and transfers the formed toner image to printing paper that it is transported from the printing-paper-supply unit 5. Moreover, the image-forming unit 4 includes a fixing unit 41. The fixing unit 41 fixes the toner image that is transferred to the printing paper at a specific fixing temperature.

Figure 2:
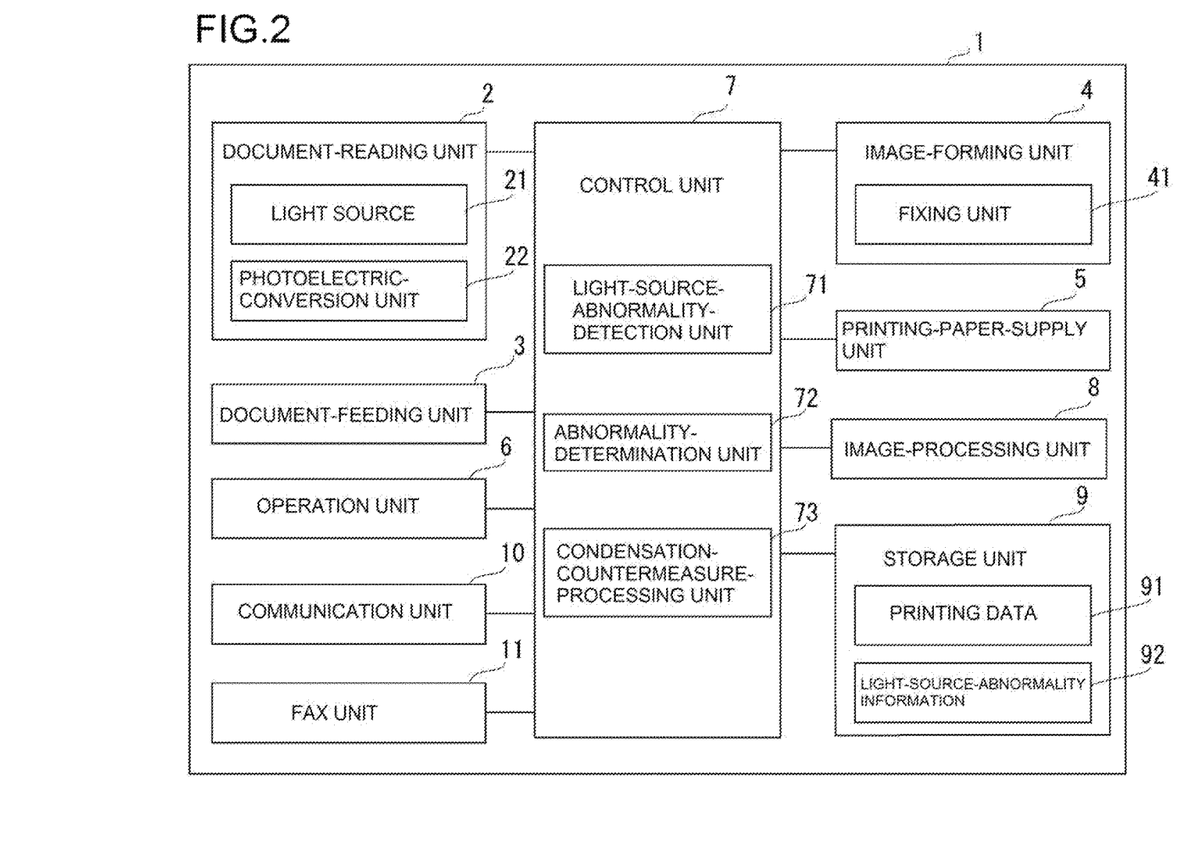
FIG. 2 is a block diagram illustrating an overview of the image-forming device illustrated in FIG. 1.

FIG. 3 is a block diagram illustrating an overview of the configuration of the image-forming device. The document-reading unit 2, the document-feeding unit 3, the image-forming unit 4, the printing-paper-supply unit 5 and the operation unit 6 described above are connected to the control unit 7, and the operation is controlled by the control unit 7. Moreover, an image-processing unit 8, a storage unit 9, a communication unit 10 and a FAX unit 11 are connected to the control unit 7.

The control unit 7 is an information-processing unit such as a microcomputer that includes a CPU (Central Processing Unit), ROM (Read Only Memory), RAM (Random Access Memory) and the like. A control program for performing operation control of the image-forming device 1 is stored in the ROM. The CPU of the control unit 7 reads the control program that is stored in ROM, and by expanding the control program in RAM, performs control of the entire device according to specific instruction information that is inputted from the operation unit 6. Moreover, the control unit 7 functions as a light-source-abnormality-detection unit 71, an abnormality-determination unit 72, and a condensation-countermeasure-processing unit 73.

The light-source-abnormality detection unit 71 executes a light-source-abnormality detection operation for detecting abnormalities of the light source 21 based on the signal level that is outputted from the photoelectric-conversion unit 22. A white reference board W that is a reference for shading correction is provided on the side of the document reading position, and the light-source-abnormality-detection unit 71 moves the light source 21 to the position of the white reference board W, and compares the signal level that is outputted from the photoelectric-conversion unit 22 based on the reflected light from the white reference board W with a preset abnormality-detection threshold value. Then, when the signal level that is outputted from the photoelectric-conversion unit 22 is less than the abnormality-detection threshold value, the light-source-abnormality-detection unit 71 detects an abnormality in the light source 21. The light-source-abnormality-detection operation by the light-source-abnormality-detection unit 71 is executed at the time of startup when the power to the image-forming device 1 is turned ON, and when reading a document just before staring reading of a document by the document-reading unit 2. When an abnormality in the light source 21 is detected by the light-source-abnormality-detection operation that is executed at startup, the light-source-abnormality-detection unit 71 stores the signal level that was outputted from the photoelectric-conversion unit 22 during the light-source-abnormality detection operation at startup (hereafter, referred to as the startup signal level) and the startup time in the storage unit 9 as light-source-abnormality information 92. In other words, the storage unit 9 functions as a light-source-abnormality information storage unit for storing light-source-abnormality information 92. Instead of the storage unit 9 the light-source-abnormality detection unit 71 may also cause the RAM of the control unit 7 to function as a light-source-abnormality information storage unit.

When an abnormality is detected in the light source by the light-source-abnormality-detection operation that is executed when reading a document, the abnormality-determination unit 72 compares the signal level that is outputted from photoelectric-conversion unit 22 in the light-source-abnormality-detection operation when reading a document (hereafter, called the document-reading signal level), with the startup signal level of the light-source-abnormality information 92. Then, the abnormality-determination unit 72, based on the comparison results, determines whether the detected abnormality of the light source 21 is an abnormality due to condensation, or is an abnormality due to the device itself such as a problem with the light source due to something other than condensation (burned out lamp) and the like.

The condensation-countermeasure-processing unit 73, together with executing a condensation-countermeasure operation that applies heat to each of the components of the document-reading unit 2 (light source 21, photoelectric-conversion unit 22, mirrors 23, 24, 25, imaging lens 26), estimates the condensation-processing time until condensation can be eliminated by the condensation-countermeasure operation.

Then image-processing unit 8 is means for performing specific image processing on image data; for example, image improvement processing such as enlargement/reduction process, tone adjustment, density adjustment and the like are performed.

The storage unit 9 is storage means such as a semiconductor memory, a HDD (Hard Disk Drive) or the like, and stores image data that is receive by the document-reading unit 2, text data and image data that are received by way of the communication unit 10, and image data that is received by way of the FAX unit 11 as printing data 91.

The communication unit 10 has a function that by way of a network such as the Internet, LAN or the like, transmits or receives various kinds of data such as text data, image data and the like between a peripheral device such as a personal computer and other image-forming devices.

The FAX unit 11 has a modem and is equipped with the facsimile transmitting function and a facsimile receiving function. The facsimile transmitting function generates a facsimile signal from image data that is read by the document-reading unit 2, and transmits the generated facsimile signal by way of a network such as a telephone network or the like. The facsimile receiving function receives a facsimile signal by way of a telephone network, and generates image data from the received facsimile signal. The image data that is received and generated by the facsimile receiving function is stored in the storage unit 9 as printing data 91, and is printed on printing paper by the image-forming unit 4.

Next, the light-source-abnormality-detection operation at startup by the light-source-abnormality-detection unit 71 will be explained in detail with reference to FIG. 3.

At startup when the power to the image-forming device is turned ON, the control unit 7 functions as a light-source-abnormality-detection unit 71, and starts the light-source-abnormality-detection operation.

Figure 3:
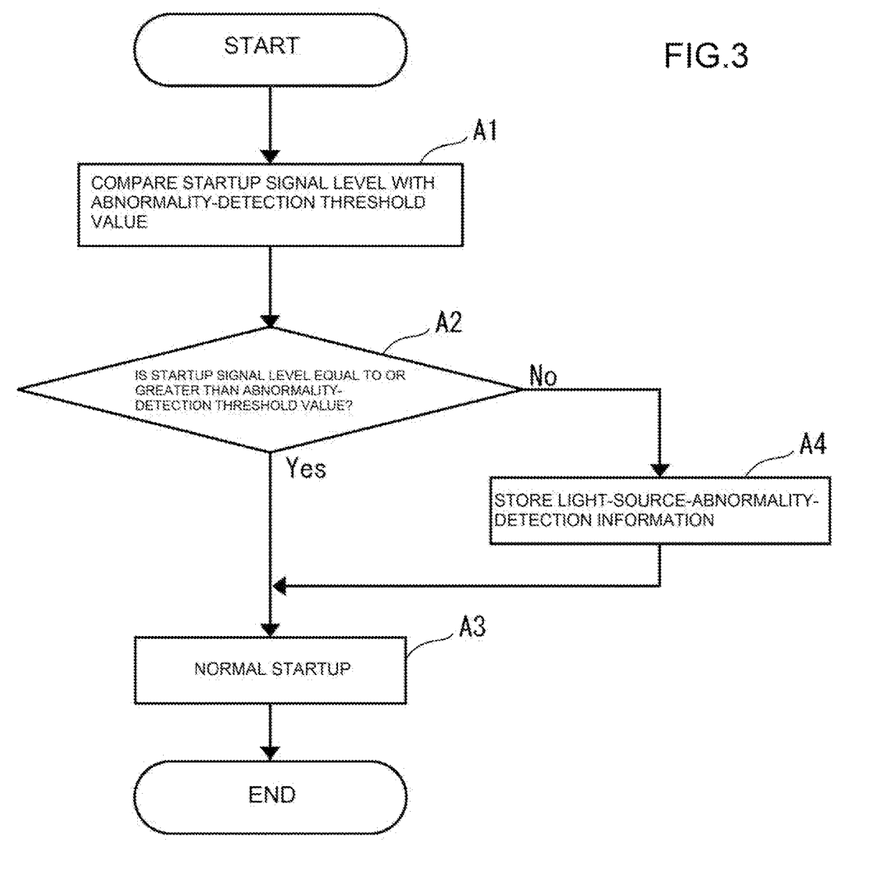
FIG. 3 is a flowchart illustrating a light-source-abnormality-detection operation by the light-source-abnormality-detection unit illustrated in FIG. 2.

Referring to FIG. 3, the light-source-abnormality-detection unit 71, based on the reflected light from the white reference board W, compares the signal level (startup signal level) that is outputted from the photoelectric-conversion unit 22, with the preset abnormality-detection threshold value (step A1), and determines whether or not the signal level that is outputted from the photoelectric-conversion unit 22 is equal to or greater than the abnormality-detection threshold value (step A2). The photoelectric-conversion unit 22 outputs a plurality of pixel signals that are arranged in the main scanning direction. Therefore, the average of the plurality of pixel signals, or the maximum or minimum signal level is compared with the abnormality-detection threshold value.

In step A2, when the signal level that is outputted from the photoelectric-conversion unit 22 is equal to or greater than the abnormality-detection threshold value, the light-source-abnormality-detection unit 71 ends the light-source-abnormality-detection operation. After that, when abnormality is also not seen in any of the other parts, such as the image-forming unit 4, other than the document-reading unit 2, the control unit 7 allows normal startup of the image-forming device 1 (step A3). As a result, the image-forming device 1 is in a state in which all image-forming operations can be executed.

In step A2, when the signal level that is outputted from the photoelectric-conversion unit 22 is less than the abnormality-detection threshold value, the light-source-abnormality-detection unit 71 stores the startup signal level outputted from the photoelectric-conversion unit in the light-source-abnormality-detection operation at startup and the startup time in the storage unit 9 as light-source-abnormality information 92 (step A4), and then ends the light-source-abnormality-detection operation. After that, when abnormality also is not seen in any of the other parts, such as the image-forming unit 4, other than the document-reading unit 2, the control unit 7 goes to step A3 and allows normal startup of the image-forming device 1. As a result, the image-forming device is in a state in which all of the image-forming operations can be executed.

Figure 4:
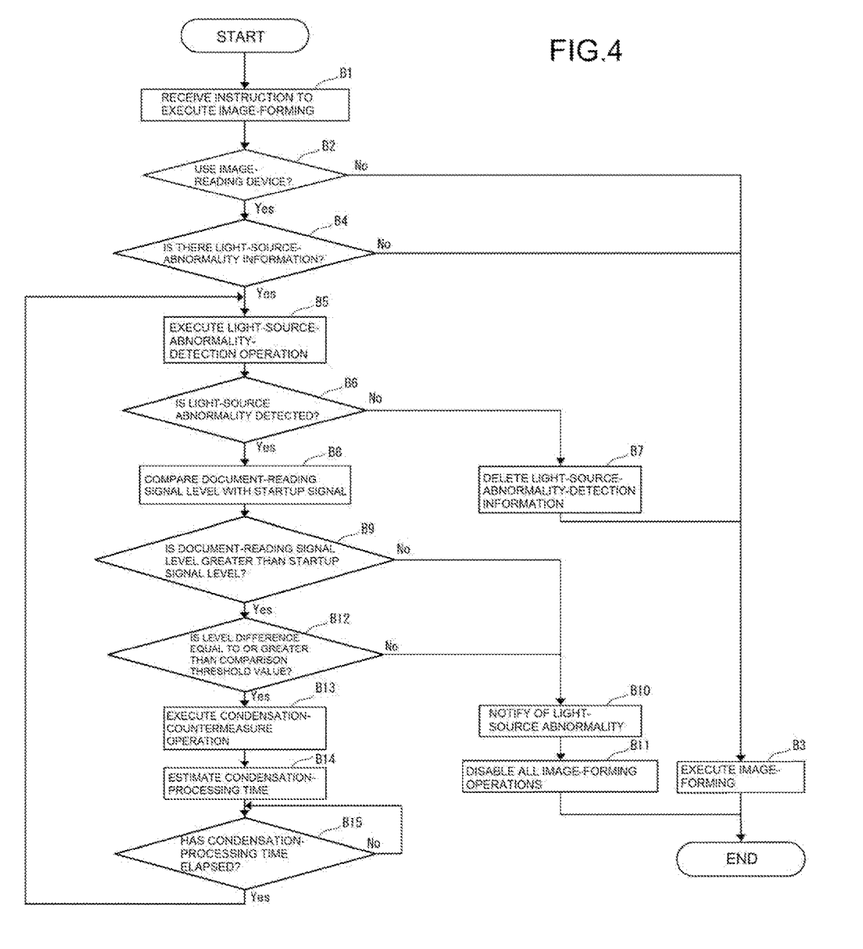
FIG. 4 is a flowchart illustrating the processing operation when an execution instruction is received by an embodiment of the image-forming device of the present disclosure.

Next, the processing operation when the image-forming device 1 receives an execution instruction will be explained in detail with reference to FIG. 4.

After receiving an execution instruction for the image-forming operation (step B1), the control unit 7 determines whether or not the image-forming operation for which the execution instruction was received is an image-forming operation that uses the document-reading unit 2 (step B2).

In step B2, when the image-forming operation does not use the document-reading unit 2, the control unit 7 executes the image-forming operation for which an execution instruction is received (step B3), and ends the processing operation. As a result, even when a abnormality in the light source 21 is detected at start up and the document-reading unit 2 cannot actually be used, image-forming operations such as a printer job that do no use the document-reading unit 2 are executed.

In step B2 when the image-forming operation uses the document-reading unit 2, the control unit 7 determines whether or not light-abnormality information 92 is stored in the storage unit 9 (step B4).

In step B4 when light-abnormality information 92 is not stored in the storage unit 9, the control unit 7 executes the image-forming operation for which an execution instruction was received (step B3), and ends the processing operation. As a result, when an abnormality in the light source 21 is not detected at startup, image-forming operations such as a copying job, a scanning job, a facsimile job and the like that use the document-reading unit 2 are executed without delay.

In step B4, when light-source-abnormality information 92 is stored in the storage unit 9, the control unit 7 functions as a light-source-abnormality-detection unit 71 and executes the light-source-abnormality-detection operation when reading a document (step B5), and determines whether or not an abnormality in the light source 21 is detected (step B6).

In step B6, when no abnormality is detected in the light source 21, the light-source-detection unit 71 deletes light-source-abnormality information 92 that is stored in the storage unit 9 (step B7). Then, the control unit 7 executes the image-forming operation for which an execution instruction is received (step B3), and ends the processing operation. As a result, when abnormality in the light source 21 at startup due to a reason such as condensation and the like is eliminated, a job such as a copying job, scanning job, facsimile job and the like that uses the document-reading unit 2 is executed.

In step B6, when abnormality is detected in the light source 21, the control unit 7 functions as the abnormality-determination unit 72, and compares the signal level when reading a document with the signal level at startup in the light-source-abnormality information 92 (step B8). Then, the abnormality-determination unit 72 determines whether or not the signal level when reading a document is greater than the signal level at startup (step B9).

In step B9, when the signal level when reading a document is less than the signal level at startup, the abnormality-determination unit 72 determines that there is problem with the device itself such as a breakage of the light source 21 (burned out lamp), displays a serviceman call notifying of an abnormality in the light source 21 on the display unit of the operation unit 6 (step B10), and does not allow execution of any of the image-forming operations of the image-forming device 1 (step B11). In other words, when an abnormality in the light source 21 is due to condensation, there is a tendency for condensation to gradually disappear after the power to the image-forming device 1 is turned ON, and the signal level when reading a document becomes greater than the signal level at startup. Therefore, when the signal level when reading a document is less than the signal level at startup, it is determined that abnormality in the light source is not due to condensation.

In step B9 when the document-reading signal level is greater than the startup signal level, the abnormality-determination unit 72 determines whether or not the level difference between the document-reading signal level and the startup signal level is equal to or greater than a comparison threshold value (step B12). The comparison threshold value is set based on the time elapsed from the startup time in the light-source-abnormality information 92 and the condensation processing time that will be described later, and is set so as to be a larger value the longer the elapsed time from the startup time to the document-reading time is, and the longer the condensation processing time is. For example, when the elapsed time from the startup time is taken to be "$T_1$," and the condensation processing time that will be described later is taken to be "$T_2$", the comparison threshold value is set to $\alpha T_1 + \beta T_2$ (where $\alpha$ and $\beta$ are preset coefficients, and set such that $\alpha < \beta$).

In step B12, when the level difference between the document-reading signal level and the startup signal level is less than the comparison threshold value, the abnormality-determination unit 72 determines that there is an abnormality in the device itself such as a breakage of the light source 21 (burned out lamp) or the like, and moves to step B10. In other words, when the abnormality in the light source 21 is due to condensation, there is a tendency for condensation to gradually disappear after the power to the image-forming device 1 is turned ON, and as time elapses, the level difference between the document-reading signal level and the startup signal level gradually becomes large. Therefore, when the level difference between the document-reading signal level and the startup signal level is less than the comparison threshold value that is set so as to be a larger value the longer the elapsed time from the startup time is, it is determined that the abnormality in the light source 21 is not due to condensation.

In step B12, when the level difference between the document-reading signal level and the startup signal level is equal to or greater than the comparison threshold value, the abnormality-determination unit 72 determines that the abnormality in the light source 21 is due to condensation. According to this determination, the control unit 7 functions as a condensation-countermeasure-processing unit 73 and executes a condensation-countermeasure operation that applies heat to each of the components of the document-reading unit 2 (light source 21, photoelectric-conversion unit 22, mirrors 23, 24, 25, and imaging lens 26) (step B13). The condensation-countermeasure operation by the condensation-countermeasure-processing unit 73 can be performed by passing electric current through the fixing unit 41, or by separately providing a heater for treating condensation.

Moreover, the condensation-countermeasure-processing unit 73 estimates the condensation processing time until condensation can be eliminated by the condensation-countermeasure operation according to the level difference between the document-reading signal level and the abnormality-detection threshold value (step B14), and displays the estimated condensation processing time on the display unit of the operation unit 6. As a result, a user is able to know the time until the image-forming operation for which an instruction is given will start. For example, by the condensation-countermeasure operation, the unit time is preset as "h", and the level for which condensation can be eliminated is preset at "A". Then, when the level difference between the document-reading signal level and the abnormality-detection threshold value is taken to be "D", (D/A)×h is estimated as the condensation-processing time.

Next, the control unit 7 functions as the light-source-abnormality-detection unit 71, and waits for the condensation processing time estimated in step B14 to elapse (step B15), and after the condensation processing time has elapsed, returns to step B5 and executes the light-source-abnormality-detection operation again.

When condensation is removed in the condensation-countermeasure operation by the condensation-countermeasure-processing unit 73, abnormality in the light source 21 will not be detected in step B6, and the image-forming operation will be executed in step B3. The condensation-countermeasure operation by the condensation-countermeasure-processing unit 73 ends at the point in time when abnormality in the light source 21 is not detected in step B6.

When condensation is not eliminated in the condensation-countermeasure operation by the condensation-countermeasure processing unit 73, abnormality in the light source 21 will be detected in step B6, and then whether or not the level difference between the document-reading signal level and the startup signal level is equal to or greater than the comparison threshold value will be determined in step B12. The comparison threshold value is set to a larger value the longer the condensation processing time described above is. Therefore, in step B12, the effect by the condensation-countermeasure operation is verified. When the effect by the condensation-countermeasure operation is obtained to a certain extent, the level difference in step B12 is equal to or greater than the comparison threshold value, and the condensation-countermeasure operation is continued in step B13. When an effect by the condensation-countermeasure operation is not obtained, the level difference in step B12 is less than the comparison threshold value, and in step B11, execution of all of the image-forming operations by the image-forming device 1 is disabled.

As was explained above, in this embodiment, the image-forming device 1 includes a document-reading unit 2 that irradiates light from a light source 21 onto a document and converts the reflected light from the document to image data by a photoelectric-conversion unit 22, and together with being able to execute image-forming operations that use the document-reading unit 2, is also able to execute image-forming operations that do not use the document-reading unit 2. The image-forming device 1 includes a light-source-abnormality-detection unit 71. The light-source-abnormality-detection unit 71 executes a light-source-abnormality-detection operation that compares a signal level that is outputted from the photoelectric-conversion unit 22 with a preset abnormality-detection threshold value, and when an abnormality in the light source 21 is detected by the light-source-abnormality-detection operation that is executed at startup, the startup signal level that is outputted from the photoelectric-conversion unit 22 at startup is stored in a storage unit 9 as light-source-abnormality information 92. Regardless of the detection result from the light-source-abnormality-detection operation that is executed at startup, the image-forming device 1 normally starts in a state in which all of the image-forming operations can be executed.

With this configuration, the image-forming device 1 is normally started in a state in which all of the image-forming operations can be executed even when an abnormality in the light source 21 is detected in the initial operation at startup, so it is possible to execute image-forming operations that do not use the document-reading unit 2 without any problem even when a fatal abnormality in the light source is occurring.

Furthermore, with this embodiment, the light-source-abnormality-detection unit 71, after receiving an instruction to execute an image-forming operation that uses the document-reading unit 2, executes a light-source-abnormality-detection operation when reading a document just before beginning to read a document by the document-reading unit 2. The image-forming device 1 includes an abnormality-determination unit 72. When an abnormality in the light source 21 is detected in the light-source-abnormality-detection operation that is executed at the time of reading a document, the abnormality-determination unit 72 determines whether or not the abnormality in the light source 21 is due to condensation by comparing a document-reading signal level that is outputted from the photoelectric-conversion unit 22 when reading a document with the startup signal level. When it is determined that the abnormality in the light source 21 is not an abnormality due to condensation, the abnormality-determination unit 72 disables execution of all of the image-forming operations.

With this configuration, when executing an image-forming operation that uses the document-reading unit 2, it is possible to determine whether an abnormality in the light source 21 that is detected by the light-source-abnormality-detection unit 71 is an abnormality due to condensation that can be eliminated, or is a fatal abnormality.

Moreover, with this embodiment, when the level difference between the document-reading signal level and the startup signal level is less than a comparison threshold value, the abnormality-determination unit 72 determines that the abnormality in the light source 21 is not due to condensation. Furthermore, in this embodiment, the comparison threshold value is set to be a larger value the longer the elapsed time from startup until reading a document is.

With this configuration, it is possible to accurately determine whether an abnormality in the light source 21 that is detected by the light-source-abnormality-detection unit 71 is an abnormality due to condensation that can be eliminated, or is a fatal abnormality. In other words, when an abnormality in the light source 21 is due to condensation, there is a tendency for the condensation to gradually disappear after the power to the image-forming device 1 is turned ON, and as time elapses, the level difference between the document-reading signal level and the startup signal level gradually becomes large. Therefore, when the level difference between the document-reading signal level and startup signal level is less than a comparison threshold value that is set to be a larger value the longer the elapsed time from startup is, it is possible to determine that the abnormality in the light source 21 is not due to condensation.

Furthermore, with this embodiment, when the abnormality-determination unit 72 determines that an abnormality in the light source 21 is an abnormality due to condensation, there is a condensation-countermeasure-processing unit 73 that executes a condensation-countermeasure operation that applies heat to the document-reading unit 2.

With this configuration, it is possible to effectively perform countermeasures against condensation.

Furthermore, with this embodiment, the condensation-countermeasure-processing unit 73 estimates the condensation processing time by the condensation-countermeasure operation until condensation disappears according to the level difference between the document-reading signal level and the abnormality-detection threshold value. After the condensation processing time elapses after the start of execution of the condensation-countermeasure operation, the light-source-abnormality-detection unit 71 executes the light-source-abnormality-detection operation when reading a document. When the level difference between the document-reading signal level and the startup signal level is less that the comparison threshold value that is set to be a larger value the longer the condensation processing time is, the abnormality-detection unit 72 determines that the abnormality in the light source 21 is not due to condensation and disables all of the image-forming operations.

With this configuration, it is possible to verify the effect of the condensation-countermeasure operation.

In typical technology, when an abnormality in the light source is detected, it becomes impossible to execute any of the operations of the image-forming device. Therefore, when an abnormality in the light source of the document-reading unit is detected in the initial operation at startup, initialization cannot be completed, so all of the operations of the image-forming device are stopped regardless of whether or not the document-reading unit will be used.

Taking the above points into consideration, the object of the present disclosure is to provide an image-forming device that is able to execute operations that do not use the document-reading unit even when an abnormality in the light source is detected in the initial operation at startup.

With the present disclosure, a state in which all of the image-forming operations can be executed is normally started even when an abnormality is detected in the light source in the initial operation at startup, so has the effect that it is possible to execute image-forming operations that do not use the document-reading unit without any problems even when a fatal abnormality occurs in the light source.

The present disclosure is not limited to the embodiments described above, and it is evident that the embodiments can be appropriately modified within the technical scope of the disclosure.

What is claimed is:

1. An image-forming device that comprises a document-reading unit that irradiates light from a light source onto a document and, by a photoelectric-conversion unit, converts reflected light from the document into image data, and together with being able to execute image-forming operations that use the document-reading unit, is able to execute image-forming operations that do not use the document-reading unit; and further comprises:
    a light-source-abnormality-detection unit that executes a light-source-abnormality-detection operation that compares a signal level that is outputted from the photoelectric-conversion unit with a preset abnormality-detection threshold value, and when an abnormality in the light source is detected by the light-source-abnormality-detection operation that is executed at startup, stores a startup signal level that is outputted from the photoelectric-conversion unit at the startup in a light-source-abnormality-storage unit as light-source-abnormality information; and
    performs normal startup to a state in which all image-forming operations can be executed regardless of the detection results of the light-source-abnormality-detection operation that is executed at the startup,
    wherein
    the light-source-abnormality-detection unit
    when an instruction to execute an image-forming operation that uses the document-reading unit is received, executes the light-source-abnormality-detection operation when reading a document immediately before the document-reading unit starts to read a document; and comprises
    an abnormality-determination unit that
    when the abnormality in the light source is detected by the light-source-abnormality-detection operation that is executed when reading the document, determines whether or not the abnormality in the light source is an abnormality due to condensation by comparing the document-reading signal level that is outputted from the photoelectric-conversion unit when reading a document with the startup signal level; wherein
    when the abnormality in the light source is determined not to be an abnormality that is due to condensation, the abnormality-determination unit disables execution of all image-forming operations.

2. The image-forming device according to claim 1, wherein the abnormality-determination unit determines that abnormality in the light source is not due to condensation when the level difference between the document-reading signal level and the startup signal level is less than a comparison threshold value.

3. The image-forming device according to claim 2, wherein the comparison threshold value is set so as to be a larger value the longer the elapsed time from startup to reading a document is.

4. The image-forming device according to claim 1 further comprising a condensation-countermeasure-processing unit that, when the abnormality-determination unit determines that abnormality in the light source is an abnormality that is due to condensation, executes a condensation-countermeasure operation that applies heat to the document-reading unit.

5. The image-forming device according to claim 4, wherein
    the condensation-countermeasure-processing unit estimates condensation-processing time until condensation can be eliminated by the condensation-countermeasure operation according to the level difference between the document-reading signal level and the abnormality-detection threshold value;
    the light-source-abnormality-detection unit executes the light-source-abnormality-detection operation when reading a document when the condensation-processing time has elapsed after starting execution of the condensation-countermeasure operation; and
    the abnormality-determination unit, when the level difference between the document-reading signal level and the startup signal level is less than a comparison threshold value that is set to be a larger value the longer the condensation processing time is, determines that the abnormality in the light source is not due to condensation and disables all of the image-forming operations.

* * * * *